United States Patent

[11] 3,545,358

| [72] | Inventor | Robert H. Russell |
| | | Framingham Center, Massachusetts |
| [21] | Appl. No. | 674,390 |
| [22] | Filed | Oct. 11, 1967 |
| [45] | Patented | Dec. 8, 1970 |
| [73] | Assignee | Polaroid Corporation |
| | | Cambridge, Massachusetts |
| | | a corporation of Delaware |

[54] MOLDED CAMERA BELLOWS
7 Claims, 4 Drawing Figs.

[52] U.S. Cl. .................................................... 95/39
[51] Int. Cl. .............................................. G03b 17/04
[50] Field of Search............................................ 95/39;
18/19(F); 222/206; 46/244, 180; 84/376, 355

[56] References Cited
UNITED STATES PATENTS

| 2,578,111 | 12/1951 | Turner .......................... | 95/39 |
| 3,160,083 | 12/1964 | Neumeister .................. | 95/39(X) |
| 3,162,371 | 12/1964 | Palmer .......................... | 222/206(X) |
| 3,421,425 | 1/1969 | Brandt.......................... | 95/39 |

FOREIGN PATENTS

| 1,028,360 | 4/1958 | Germany....................... | 95/39 |

Primary Examiner—John M. Horan
Attorneys—Brown and Mikulka, William D. Roberson and Leonard S. Selman ABSTRACT: A camera bellows structure molded of a plastic material in such a way that fold lines are formed on either side of a central hinge connecting portion to facilitate controlled bending of the bellows.

PATENTED DEC 8 1970

3,545,358

INVENTOR.
Robert H. Russell
BY
Brown and Mikulka
Leonard S. Selman
ATTORNEYS

MOLDED CAMERA BELLOWS

BACKGROUND AND SUMMARY OF THE INVENTION

In the usual folding type camera a protected light path is provided between the objective lens and film plane by an expansible and collapsible bellows. The flexible nature of the bellows permits easy adjustment of the lens relative to the film plane for focusing and other optical purposes. Also the bellows may be completely collapsed to a substantially flat position to allow movement of the lens into proximity with the camera body, thereby providing a much more compact device in the folded position to facilitate handling, transport and storage. The bellows is normally attached in lighttight engagement at its first and rear ends, respectively, with the lens board or shutter housing and the camera body.

Copending U.S. Pat. application Ser. No. 574,461, filed Aug. 23, 1966 in the name of Christopher R. Rice, now U.S. Pat. No. 3,447,439, issued June 3, 1969, discloses novel camera bellows fabricated by heating and reforming the bellows material, rather than by cutting and folding according to previous, conventional techniques. One of the principal advantages of a satisfactory bellows fabricated from plastic materials by molding techniques is the significant economy realized by the speed and repeatability of such methods of manufacture. The present invention is also concerned with camera bellows molded from materials such as plastics and having certain additional improvements and refinements not found in the prior art, including the molded bellows disclosed in the aforementioned copending application. In particular, this invention provides an improved configuration at the outside and inside folds of the bellows comprising pairs of closely spaced fold lines on either side of the central hinge connecting portions.

Accordingly, it is a general object of this invention to provide a camera bellows of molded plastic material having a high flex life and improved folding characteristics.

A more specific object of the invention is to provide a bellows having an improved fold configuration.

Another object is to provide a novel camera bellows which is simple and economical in manufacture and rugged and durable in use.

Other objects of the invention will in part be obvious and will in part appear hereinafter.

The invention accordingly comprises an article of manufacture possessing the features, properties and relation of elements which will be exemplified in the article hereinafter described and the scope of the application of which will be indicated in the claims.

For a fuller understanding of the nature and objects of the invention, reference should be had to the following detailed description taken in connection with the accompanying drawings.

DESCRIPTION OF THE PREFERRED EMBODIMENTS

Figures 1, 2, 3, 4:
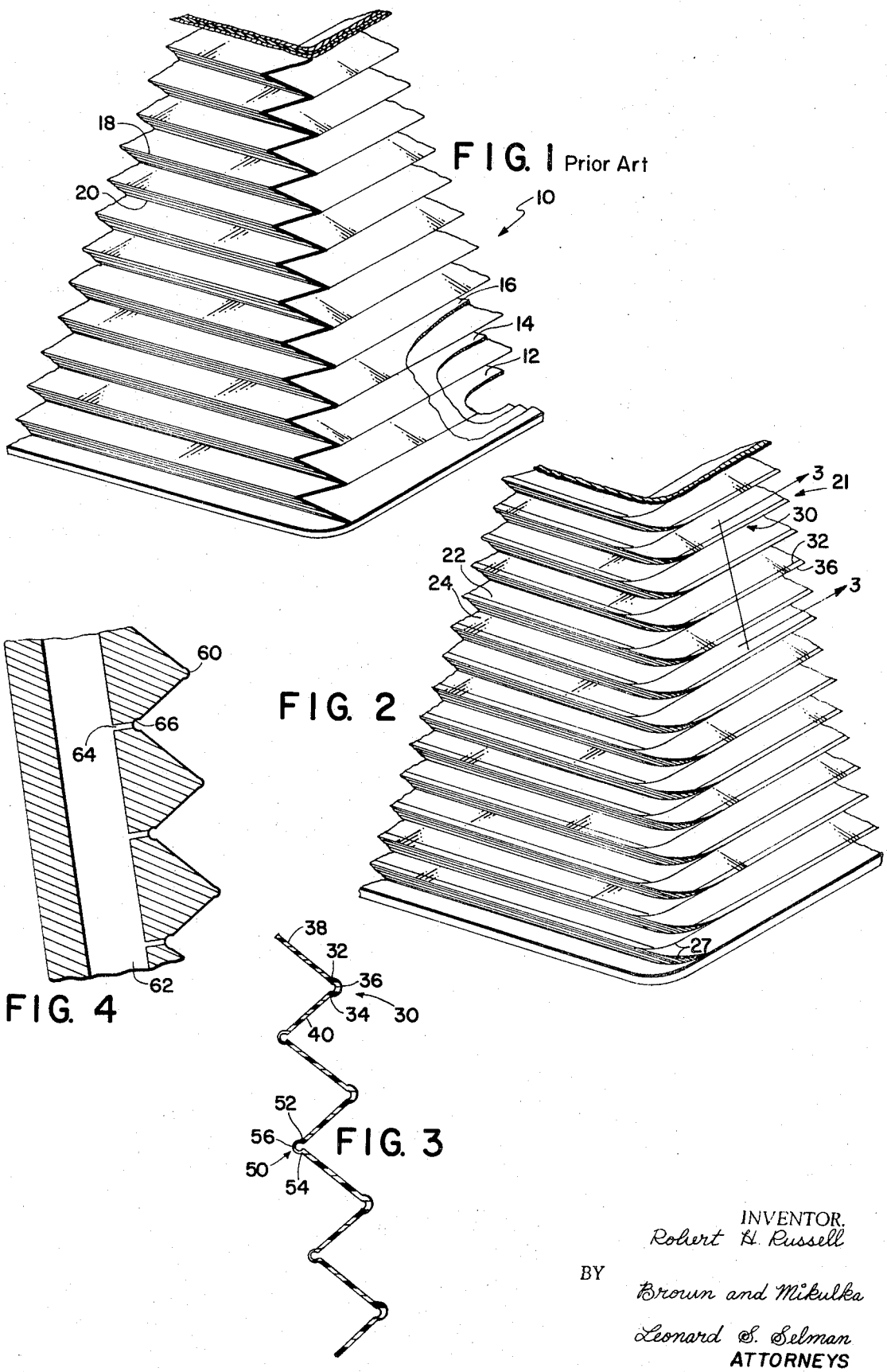
FIG. 1 is a fragmentary perspective view of a prior art camera bellows with portions broken away to show the structure of the material.
FIG. 2 is a fragmentary perspective view of the plastic bellows constructed according to the present invention.
FIG. 3 is a fragmentary cross-sectional view taken on line 3—3 of FIG. 2 illustrating the wall thickness and configuration of the folds.
FIG. 4 is a fragmentary cross-sectional view of a male mold for vacuum forming the plastic bellows.

While the bellows of the present invention may have many applications, it is especially useful because of the folding characteristics as a camera bellows. As customary the wall of the bellows has multiple folds therein to allow for collapsing, for example, when the camera is not in use. It has been found that the ease of collapsing the bellows is not only dependent upon the stiffness of the plastic material used but may also be effected by the configuration of the folds. Thus the mold on which the plastic bellows of the present invention is formed is machined in such a manner to be described to produce a bellows which is configured to greatly relieve the stress at the folds allowing for the use of a wide variety of plastic materials while maintaining good flexibility and collapsibility.

Referring now to the drawings, in FIG. 1 is shown a camera bellows 10 constructed according to conventional, presently known methods and of the usual materials, comprising an inner layer 12 of black fabric, a center layer 14 of paper or cardboard and an outer layer 16 of fabric, vinyl or other such material. The material is first cut, according to a pattern, in the proper shape from a flat sheet. The sheet is folded in zigzag fashion in four sections and then joined along opposite edges to form a tunnel, each of the four sections forming one of the sides. Thus, each section includes succession of alternate "outside folds" 18 and "inside folds" 20. Since the bellows is formed by folding an initially flat, continuous sheet, it is necessary, in order to achieve the desired flatness in the collapsed or folded position, to abut an outside fold on one section or side of the bellows with an inside fold on the two adjoining sections. Each convolution of the bellows is, therefore, made up of two inside and two outside folds.

A preferred embodiment of the bellows of the present invention is shown in FIG. 2 and denoted by the reference numeral 21. It is manufactured from a single sheet of synthetic plastic seamless material. Bellows 21 also comprises alternate outside folds 22 and inside folds 24 with each outside fold on one side in alinement with inside folds of the two adjacent sides. A plurality of edge folds are shown at 26 which also form a zigzag pattern as they provide a hinge for adjacent walls. Reference numeral 27 denotes the improved configuration which is the subject of aforesaid U.S. Pat. No. 3,447,439, wherein the sharp corners at the junction points of the edge folds 26 and the outside folds 22 are eliminated and replaced by the rounded configuration shown.

The present invention is directed toward the configuration at the folds and is best shown in the cross-sectional view of FIG. 3 taken along line 3—3 of FIG. 2. As illustrated, the outer fold 30 comprises a pair of closely spaced fold lines 32 and 34 on either side of a hinged connecting portion 36. The wall thickness of the hinged connecting portion 36 tends to be slightly thicker than the wall portions 38 and 40 on either side of the fold due to the way in which the bellows are molded which will be described later.

The inner folds 50 similarly comprise a pair of closely spaced fold lines 52 and 54 on either side of a hinged connecting portion 56. However, also due to the method of molding the bellows, the wall thickness of the connecting portion 56 at the inner folds tends to be slightly thinner than the wall portions on either side of the fold.

Basic to this invention is the concept of molding the alternate outside and inside folds into the flexible plastic sheet rather than by folding. As brought out previously, this may be accomplished by first forming a male mold to the exact configuration desired in the flexible plastic material and molding the flexible plastic material around the mold using the well known technique of vacuum molding. The advantage in this technique is not only in the speed and economy of manufacture but also that it is possible to obtain configurations using material that is plastic and will flow that are impossible to obtain by merely folding a flat sheet of material in the manner most conventional bellows are manufactured today. Thus, the mold used in producing the improved bellows of the present invention is formed generally in the shape of a conventional expanded camera bellows but with the aforementioned improved configuration. FIG. 4 of the drawing is a fragmentary cross-sectional of the male mold used in the manufacturing process. The portions 60 shown at the apex of the angular walls forming the outer folds are shaped so that the plastic material when molded thereabout will be shaped as shown in FIG. 3. The plastic material which is preheated before the vacuum is applied tends to chill at these outer protuberances and maintain its thickness at these points while the material on either side stretches somewhat under the pull of the vacuum which is applied through passageways 62 and 64. The fold lines 32 and 34 on either side of the resulting slightly thicker portion 36, however, provide excellent folding characteristics despite this increased thickness. A portion 66 of the male mold is shaped by machining to form the undercut configuration shown against which the plastic material is drawn by the vacuum means to form the inner folds 50. The vacuum in this case slightly stretches the material forming the hinged connecting portion 56 between the fold lines 52 and 54 resulting in a slightly thinner wall section at this point.

Thus it is seen that the improved fold configuration will allow the use of thicker plastic materials which can provide more strength and wearability to the bellows while still showing excellent collapsibility. It has also been found that the configuration of the closely spaced fold lines at the extremities of the folds aids in retaining the desired shape of the bellows especially when made from a more flexible material which may be deformed more easily. The bellows so made have a tendency to "pop" back into shape when deformed.

Since certain changes may be made in the above article without departing from the scope of the invention herein involved, it is intended that all matter contained in the above description or shown in the accompanying drawings shall be interpreted as illustrative and not in a limiting sense.

I claim:

1. An expansible and collapsible bellows for use on a photographic camera or the like, said bellows comprising:
   a sheet of flexible material defining a space enclosed by wall portions, each of said walls being folded alternately toward and away from the major axis of the bellows forming inside and outside folds, said inside and outside folds being alternately separated by hinge members, one of said hinge members having a thickness greater than the thickness of said folds, another of said hinge members having a thickness less than the thickness of said folds, said hinges and said folds each being demarcated by molded fold lines.

2. The invention according to claim 1 wherein said wall portion includes four sides joined together to have a substantially rectangular cross section.

3. The invention according to claim 1 wherein said wall portion includes four sides joined together to have a substantially rectangular cross section, said sides converging from one end of said bellows toward the other whereby said bellows has a generally pyramidal shape in the expanded position.

4. The bellows according to claim 1 wherein said wall portion includes four sides joined together to have a substantially rectangular cross section.

5. The bellows according to claim 4 wherein said sides converge from one end of said bellows toward the other whereby said bellows has a generally pyramidal shape in the expanded position.

6. A bellows according to claim 4 wherein said sheet of flexible material is a polymeric material and is molded into a unitary structure.

7. A method of making a camera bellows, the steps comprising:
   placing a single sheet of polymeric material in a mold;
   evacuating ambient air from between the sheet and the mold; and
   selectively and sequentially evacuating areas between the bellows and the mold at points corresponding to the inner fold portions of the finally molded bellows whereby a unitary bellows structure is formed which has inside and outside folds separated by hinge members, one of the hinge members having a thickness greater than the thickness of the folds, and another of the hinge members having a thickness less than the thickness of the folds, the hinges and the folds being demarcated by molded fold lines.